P. H. THOMAS.
VAPOR ELECTRIC LAMP CIRCUIT.
APPLICATION FILED JAN. 27, 1905.
949,335.
Patented Feb. 15, 1910.
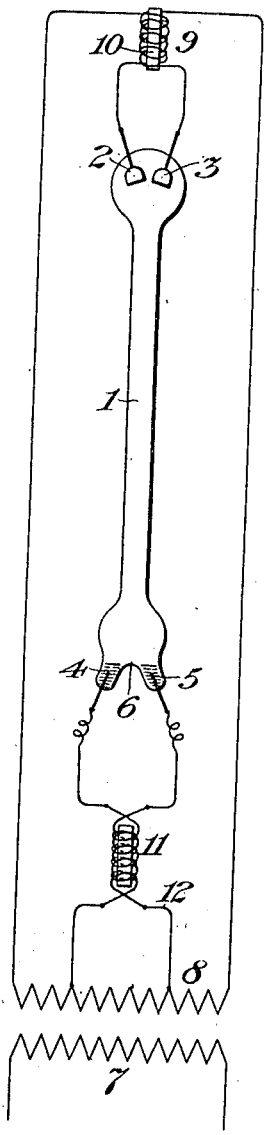

UNITED STATES PATENT OFFICE.

PERCY H. THOMAS, OF MONTCLAIR, NEW JERSEY, ASSIGNOR TO COOPER HEWITT ELECTRIC COMPANY, OF NEW YORK, N. Y., A CORPORATION OF NEW YORK.

VAPOR-ELECTRIC-LAMP CIRCUIT.

949,335.	Specification of Letters Patent.	Patented Feb. 15, 1910.

Application filed January 27, 1905. Serial No. 242,862.

*To all whom it may concern:*

Be it known that I, PERCY H. THOMAS, a citizen of the United States, and resident of Montclair, county of Essex, State of New Jersey, have invented certain new and useful Improvements in Vapor-Electric-Lamp Circuits, of which the following is a specification.

When single-phase alternating current vapor lamps provided with a single negative electrode are started into operation by rupturing an internal circuit, it sometimes happens that the break in the circuit does not occur at the right phase for constituting the electrode which is intended for the negative electrode of the apparatus a true negative electrode. Consequently, the rupturing of the internal circuit has to take place a number of times before the right moment of rupture is hit upon.

It is obviously of advantage at times to provide apparatus which will start at every attempt. To accomplish this purpose I provide two negative electrodes within the container of the apparatus, the same being connected to points in the supply circuit approximating the neutral point but separated by a sufficient potential to cause some flow of current if the two negative electrodes should accidentally become connected. In other respects the circuits are as usual.

To start the apparatus, the lamp or other vapor device is shaken or tilted so as to bring the two negative electrodes into contact and separate them. The negative electrode resistance is thus broken down and the lamp or other device will start into operation through one of the positive electrodes and through the negative electrode which happens to be a true negative electrode at the moment of rupture. The device continues in operation upon the negative electrode at which the operation starts, or it may be so arranged as to work through both of the negative electrodes which may then be connected, or in case of an accidental reestablishment of contact between the negative electrodes the current may be transferred to the other negative electrode instead of remaining at the one through which it starts.

For the purpose of regulating the short circuit current and maintaining proper operation of the apparatus, I may provide an inductance in the connection between either of the negative electrodes and the source of an inductance common to both circuits.

The invention will be understood by reference to the accompanying drawing which is a diagram of an apparatus well adapted to the carrying out of my invention.

In the drawing, 1 is the container of a vapor lamp having two positive electrodes, 2 and 3, and two negative electrodes, 4 and 5, the latter electrodes are in this instance represented as of mercury and are separated by a ridge, 6, the electrodes themselves being contained in pockets formed on opposite sides of this ridge. The negative electrodes are joined externally to a source of alternating current which in this instance is represented as a transformer having a primary, 7, and a secondary, 8, the secondary terminals being joined to the positive electrodes 2 and 3 through an inductance, 9, having a core, 10. The core 10 is represented as being surrounded by two windings, one of which is contained in the circuit leading from one terminal of the secondary to the positive electrode 2 and the other of which is shown as being included in the circuit leading from the positive terminal of the secondary to the positive electrode 3. Current flowing through one winding of the inductance 9 to the electrode 2 and the negative electrode of the apparatus stores energy in the core 10, which energy may be delivered to the apparatus either in the winding of the device 9 connected to the positive electrode 2 or in any other winding upon the same core as, for example, the winding connected in series with the positive electrode 3″. Similarly energy stored by current through the winding of the inductance 9 connected with the positive electrode 3 may be delivered in any of the windings upon the core 10. Thus, at any time energy may be delivered from the core 10 to the apparatus as, for example, at the zero point of the alternating current wave or at the time of any momentary tendency for the establishment of the negative electrode resistance.

The connections from the negative electrodes 4 and 5 to the secondary 8 are made at points on opposite sides of the neutral point of the said secondary so that there is a difference of potential between the two electrodes sufficient to cause the flow of a small current when the electrodes are in contact with each other, either at the moment of starting or through accidental causes after the operation has begun. The leads from the negative electrode are wound upon the common core 11 before being joined to a loop, 12, which leads to the points in the secondary on opposite sides of the neutral point. There is thus constituted between the negative electrodes and the source of alternating current an inductance which assists in steadying the operation of the device.

The functions of the resistance 11 will be fully understood from the following explanation of the starting and operation. When current is impressed upon the source 7 and connection exists between the electrodes 4 and 5 within the container, current will pass from the limited portion of the winding 8 which is included between the connections leading to the electrodes 4 and 5 through the two windings of the inductance 11 and the electrodes 4 and 5 and the connection between them. Since these connections are of comparatively low resistance, as is the mercury of the electrodes 4 and 5, a considerable current would tend to flow if the inductance 11 were not present. Since, however, the windings are so directed with respect to the core that current flowing to the electrode in one winding and from the electrode in the other winding tends to magnetize in the same direction, a considerable inductance is introduced which serves to control the initial current. Since this current is alternating current will sometimes be passing into one electrode and sometimes out of this electrode, but since the arrangement is symmetrical, either of the electrodes is equally capable of acting as a normal negative, so that when the break occurs within the vacuum between the electrodes 4 and 5 after the establishment of the initial alternating current from the winding 8, whichever electrode happens at that instant to be acting as the negative, will receive current from the positives in the normal way and act as the normal negative. In case, however, the electrodes 4 and 5 become connected within the chamber, current will evidently flow through both windings of the inductance 11, since in this way the total inductance will be least in view of the fact that currents passing to two electrodes tend to magnetize the core in opposite directions.

To start the lamp, the container is shaken so as to bring the materials constituting the electrodes 4 and 5 into contact over the ridge 6, after which the separation takes place and the current which, during the period of contact, has been caused to flow across the negative electrodes, is interrupted, and a flow takes place between the electrodes after separation. This causes a local breaking down of the negative electrode resistance, after which the current applied through the positive electrodes 2 and 3 is able to traverse the vapor in the apparatus and set the lamp or other device into operation. It is clear that the flow will take place from one or the other of the positive electrodes to that one of the negative electrodes which happens to be in proper relation to the coöperating positive electrode for being made active as the negative electrode of the apparatus. Thus no second shaking or tilting of the container will be necessary in order to insure the starting of the apparatus.

Should the electrodes 4 and 5 be accidentally brought into contact while the apparatus is operating, there will be no interruption of the operation, inasmuch as the main current will find a relatively easy path through the apparatus at all times after the initial breaking down of the negative electrode reluctance. It may, however, happen that the current will be transferred from the original negative starting electrode to the other electrode, or if the apparatus should become clogged, so as to maintain the negative electrode in contact, both electrodes may serve as negative electrodes.

In a divisional application, Serial Number 255,082, filed April 12, 1905, claims are made upon the method described herein.

I claim as my invention:—

1. An alternating current vapor device having a plurality of positive electrodes and two negative electrodes.

2. A single-phase alternating current vapor device having two positive electrodes and two negative electrodes.

3. A single-phase alternating current vapor device having two positive electrodes and two negative electrodes, a source of alternating current having its terminals connected to the positive electrodes and having intermediate points on opposite sides of the neutral point connected to the negative electrodes.

4. A vapor device having a plurality of positive electrodes and two negative electrodes, a source of alternating current having two terminals connected with the positive electrodes and having intermediate points on opposite sides of the neutral point connected to the negative electrodes.

5. The combination with a vapor electric device having two negative electrodes, of a source of alternating current, leads from the said negative electrodes to points in the source intermediate between the terminals thereof and the neutral point thereof, in combination with an impedance interposed between the negative electrodes and the source.

6. The combination with a vapor electric device having two negative electrodes, of a source of alternating current, leads from the said negative electrodes to points in the source intermediate between the terminals thereof and the neutral point thereof, in combination with a doubly wound inductance interposed between the negative electrodes and the source.

7. The combination with a vapor device having a plurality of positive electrodes and at least one negative electrode, of connections from the terminals of the source to the positive electrodes, connection from each negative electrode to an intermediate point of the source, and an inductance in the leads from the terminals of the source to the positive electrodes, such inductance being provided with a plurality of windings, one of which is included in the connection between each positive electrode and a terminal of the source, these windings being so wound as to magnetize the core in the same direction.

8. The combination with an alternating current circuit, a vapor device operated and started therefrom and means for severing within the vacuum space a metallic contact while carrying current derived from said circuit for breaking down the negative electrode starting reluctance, of means for enabling the apparatus to start regardless of the alternations in which the severing of the said contact occurs.

9. The combination with a gas or vapor electric apparatus and a source of alternating current of multiple leads to said apparatus, a core and multiple windings inserted in said leads between the source of current and the vapor device, said windings being so directed that a current passing to and from said container through said multiple windings magnetizes the core in the same direction in all of said windings.

10. A vapor device having a plurality of positive electrodes and two negative electrodes, a source of alternating current having terminals connected with the positive electrodes and having intermediate points on opposite sides of the neutral point connected to the negative electrodes, and means for closing the circuit through the negative electrodes.

11. A vapor device having a plurality of positive electrodes and two negative electrodes, a source of alternating current having terminals connected with the positive electrodes and having intermediate points on opposite sides of the neutral point connected to the negative electrodes, means for closing the circuit through the negative electrodes, and means for causing a separation of the said electrodes.

12. A vapor device having a plurality of positive electrodes and two negative electrodes, a source of alternating current having terminals connected with the positive electrodes and having intermediate points on opposite sides of the neutral point connected to the negative electrodes, means for closing the circuit through the negative electrodes, and means for causing a separation of the said electrodes through a suitable inductance.

13. In a vacuum apparatus operated from an alternating current circuit, means for breaking a contact carrying alternating current within the vacuum for overcoming the negative electrode starting reluctance in combination with a plurality of negative electrodes, each provided with suitable connections to the circuit, said electrodes and connections being similar and means for producing coöperative action between said negative electrodes to start the device, said last named means being included in said first named means.

14. In a gas or vapor electric apparatus the combination with a source of alternating current and a plurality of positive electrodes within said apparatus and separately connected to said source, of multiple windings related to a common core inserted in the connections to the several positive electrodes, the direction of said multiple windings being such that homologous normal currents magnetize the common core in the same direction.

15. The combination with an alternating current circuit, a vapor device comprising a hermetically sealed and completely exhausted container and suitable electrodes therefor, one at least being of vaporizable reconstructing material, the said device being operated and started from said alternating current circuit, and means for severing within the vacuum space a metallic contact while carrying current derived from the circuit for breaking down the negative electrode starting reluctance, of means for enabling the apparatus to start regardless of the alternations in which the severing of the said contact occurs.

Signed at New York, in the county of New York, and State of New York, this 24th day of January, A. D. 1905.

PERCY H. THOMAS.

Witnesses:
WM. H. CAPEL,
GEORGE H. STOCKBRIDGE.